(12) United States Patent
Mori (10) Patent No.: US 10,766,491 B2
(45) Date of Patent: Sep. 8, 2020

(54) DRIVING CHANGE CONTROL DEVICE AND DRIVING CHANGE CONTROL METHOD

(71) Applicant: DENSO CORPORATION, Kariya, Aichi-pref. (JP)

(72) Inventor: Takuya Mori, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 173 days.

(21) Appl. No.: 16/082,685

(22) PCT Filed: Jan. 27, 2017

(86) PCT No.: PCT/JP2017/002847
§ 371 (c)(1),
(2) Date: Sep. 6, 2018

(87) PCT Pub. No.: WO2017/154396
PCT Pub. Date: Sep. 14, 2017

(65) Prior Publication Data
US 2019/0039618 A1 Feb. 7, 2019

(30) Foreign Application Priority Data

Mar. 8, 2016 (JP) ................................. 2016-044604
Dec. 5, 2016 (JP) ................................. 2016-236159

(51) Int. Cl.
*G05D 1/00* (2006.01)
*B60W 30/18* (2012.01)
(Continued)

(52) U.S. Cl.
CPC ............ *B60W 30/18* (2013.01); *B60W 10/20* (2013.01); *B60W 30/095* (2013.01);
(Continued)

(58) Field of Classification Search
CPC ................. B60W 10/18; B60W 10/20; B60W 2050/0002; B60W 2050/143;
(Continued)

(56) References Cited

U.S. PATENT DOCUMENTS

| 2006/0089800 A1* | 4/2006 | Svendsen ............... G05D 1/027 |
| | | 701/301 |
| 2010/0168998 A1* | 7/2010 | Matsunaga ........... B60W 30/10 |
| | | 701/532 |

(Continued)

FOREIGN PATENT DOCUMENTS

| JP | H09-86223 A | 3/1997 |
| JP | 4057955 B | 12/2004 |

(Continued)

*Primary Examiner* — Dalena Tran
(74) *Attorney, Agent, or Firm* — Maschoff Brennan (57) ABSTRACT

A driving change control device in a vehicle equipped with an autonomous driving function for performing a driving operation on behalf of a driver and controlling an exchange of the driving operation between the autonomous driving function and the driver includes: a section setting unit that sets a change execution section where a driving change from the autonomous driving function to the driver is performed; and a parameter adjustment unit that changes a travel control parameter referred to by the autonomous driving function in a switching section before the change execution section, to adjust a traveling state of the vehicle to be a state with a driving load lower than a driving load before arrival at the switching section.

15 Claims, 7 Drawing Sheets

(51) Int. Cl.

| | |
|---|---|
| *B60W 50/00* | (2006.01) |
| *B60W 30/16* | (2020.01) |
| *G05D 1/02* | (2020.01) |
| *G08G 1/0967* | (2006.01) |
| *B60W 10/20* | (2006.01) |
| *B60W 30/095* | (2012.01) |
| *B60W 50/14* | (2020.01) |
| *B60W 40/04* | (2006.01) |

(52) U.S. Cl.
CPC ............ *B60W 30/16* (2013.01); *B60W 40/04* (2013.01); *B60W 50/0098* (2013.01); *B60W 50/14* (2013.01); *G05D 1/0061* (2013.01); *G05D 1/0223* (2013.01); *G08G 1/096725* (2013.01); *B60W 2050/0002* (2013.01); *B60W 2050/0096* (2013.01); *G05D 2201/0213* (2013.01)

(58) Field of Classification Search
CPC ....... B60W 40/04; B60W 50/14; G01C 21/26; G01C 21/3446; G05D 1/0061; G05D 2201/0213

USPC .................................. 701/23, 533; 340/438
See application file for complete search history.

(56) References Cited

U.S. PATENT DOCUMENTS

2010/0305778 A1* 12/2010 Dorneich ............. G05D 1/0044
  701/2
2014/0025259 A1* 1/2014 Szwabowski ......... B60W 50/00
  701/36

FOREIGN PATENT DOCUMENTS

| JP | 2007-196809 A | 8/2007 |
| JP | 2008-137467 A | 6/2008 |
| JP | 2009-23481 A | 2/2009 |
| JP | 2011-131838 A | 7/2011 |
| JP | 2015-182525 A | 10/2015 |
| JP | 2017-30547 A | 2/2017 |

* cited by examiner

DRIVING CHANGE CONTROL DEVICE AND DRIVING CHANGE CONTROL METHOD

CROSS REFERENCE TO RELATED APPLICATION

This application is based on Japanese Patent Application No. 2016-44604 filed on Mar. 8, 2016, and No. 2016-236159 filed on Dec. 5, 2016, the disclosures of which are incorporated herein by reference.

TECHNICAL FIELD

The present disclosure relates to a driving change control device that, in a vehicle equipped with an autonomous driving function, controls a transfer of a driving operation between the autonomous driving function and a driver and a driving change control method.

BACKGROUND ART

In a conventional technique, for example, an autonomous driving support device disclosed in Patent Literature 1 sets an output section before a switching start point where switching from autonomous driving to manual driving is started. In the output section, an actual traveling output of a vehicle is gradually switched from a traveling output requested by autonomous driving to a traveling output requested by a driver. As a result, a traveling speed of the vehicle can be smoothly changed in the switching from autonomous driving to manual driving.

With the autonomous driving function as disclosed in Patent Literature 1, the vehicle can cruise at a relatively high speed or perform following traveling in a state close to a preceding vehicle. However, when a driving change to the driver is performed in a traveling state controlled by the autonomous driving function, the driver has to receive the driving operation in a high driving load state. As a result, even when the smooth switching as described above is performed, the driver is likely to feel anxiety about the reception of the driving operation from the autonomous driving function.

PRIOR ART LITERATURES

Patent Literature

Patent Literature 1: JP-2015-182525-A

SUMMARY

It is an object of the present disclosure to provide a driving change control device and a driving change control method that make it possible to ease the anxiety of a driver when the driver receives a driving operation from an autonomous driving function.

According to a first aspect of the present disclosure, a driving change control device in a vehicle equipped with an autonomous driving function for performing a driving operation on behalf of a driver and controlling an exchange of the driving operation between the autonomous driving function and the driver, includes: a section setting unit that sets a change execution section where a driving change from the autonomous driving function to the driver is performed; and a parameter adjustment unit that changes a travel control parameter referred to by the autonomous driving function in a switching section before the change execution section, to adjust a traveling state of the vehicle to be a state with a driving load lower than a driving load before arrival at the switching section.

In the above driving change control device, the traveling state of the vehicle is adjusted to a low driving load state by changing the travel control parameter in the switching section before the change execution section. Thus, the driving operation is transferred from the automatic driving function to the driver in the low driving load state in or near the change execution section. Therefore, the anxiety of the driver when the driver receives the driving operation from the automatic driving function is eased.

According to a second aspect of the present disclosure, a driving change control method for controlling an exchange of a driving operation between an autonomous driving function and a driver in a vehicle equipped with the autonomous driving function for performing the driving operation on behalf of the driver, includes: by at least one processor, setting a change execution section where a driving change from the autonomous driving function to the driver is performed; and changing a travel control parameter referred to by the autonomous driving function in a switching section before the change execution section to adjust a traveling state of the vehicle to be a state with a driving load lower than a driving load before arrival at the switching section.

In the above driving change control method, the traveling state of the vehicle is adjusted to a low driving load state by changing the travel control parameter in the switching section before the change execution section. Thus, the driving operation is transferred from the automatic driving function to the driver in the low driving load state in or near the change execution section. Therefore, the anxiety of the driver when the driver receives the driving operation from the automatic driving function is eased.

BRIEF DESCRIPTION OF DRAWINGS

The above and other objects, features and advantages of the present disclosure will become more apparent from the following detailed description made with reference to the accompanying drawings. In the drawings:

FIG. 7 is a diagram illustrating an example of a specific configuration of the autonomous driving ECU, the vehicle control ECU, and the like.

EMBODIMENTS FOR CARRYING OUT INVENTION

Hereinbelow, a plurality of embodiments of the present disclosure will be described with reference to the drawings.

Corresponding elements between the respective embodiments may be denoted by the same reference signs to avoid repetitive description. In each of the embodiments, when only a part of a configuration is described, a configuration of the other preceding embodiments can be applied to the other part of the configuration. Further, in addition to a combination of configurations clearly stated in each of the embodiments, configurations of a plurality of embodiments may be partially combined even if not clearly stated unless there is an obstacle in the combination.

First Embodiment

Figure 1:
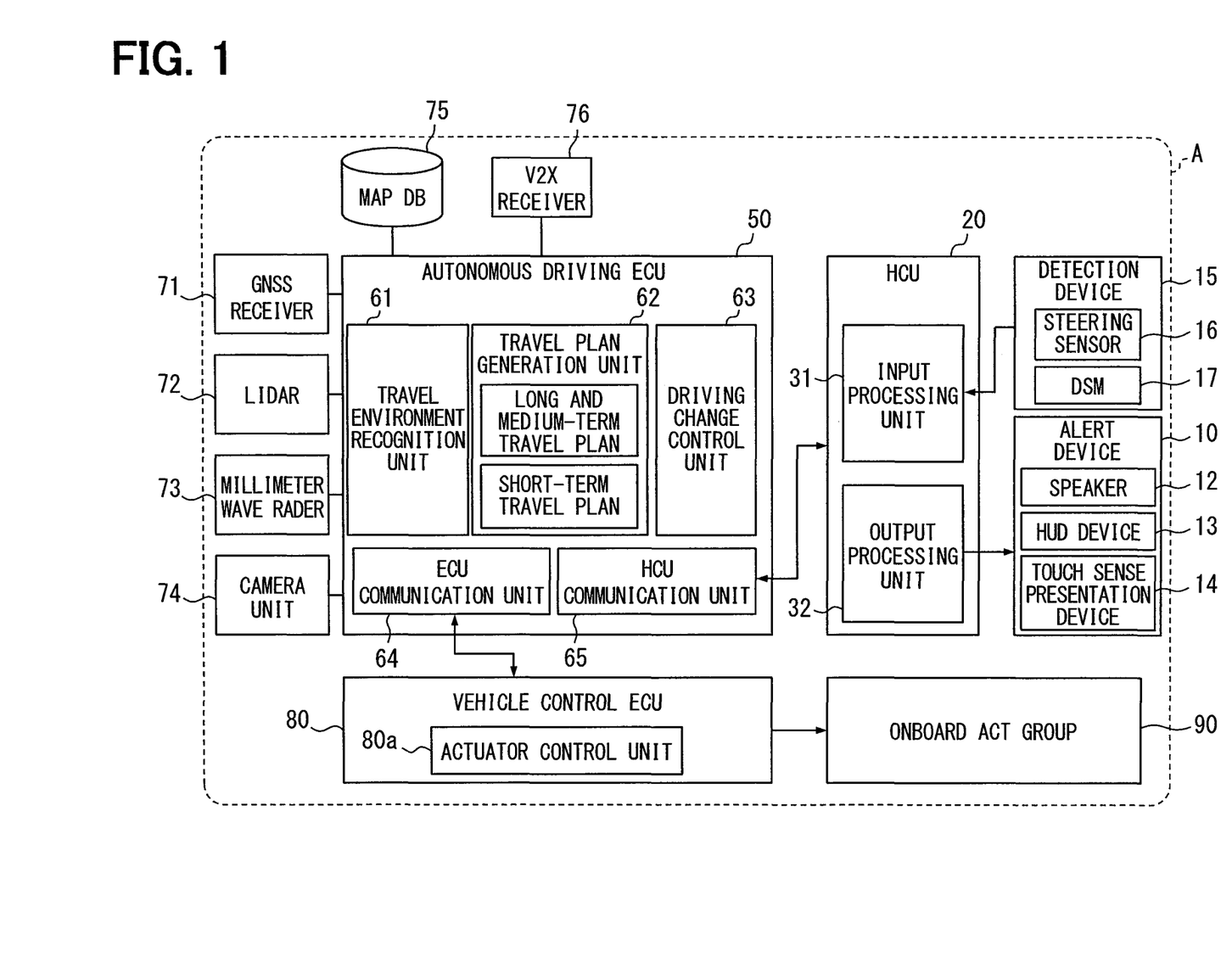
FIG. 1 is a block diagram illustrating the entire configuration of an autonomous driving ECU, an HCU, a vehicle control ECU, and the like in a first embodiment.
Figure 2:
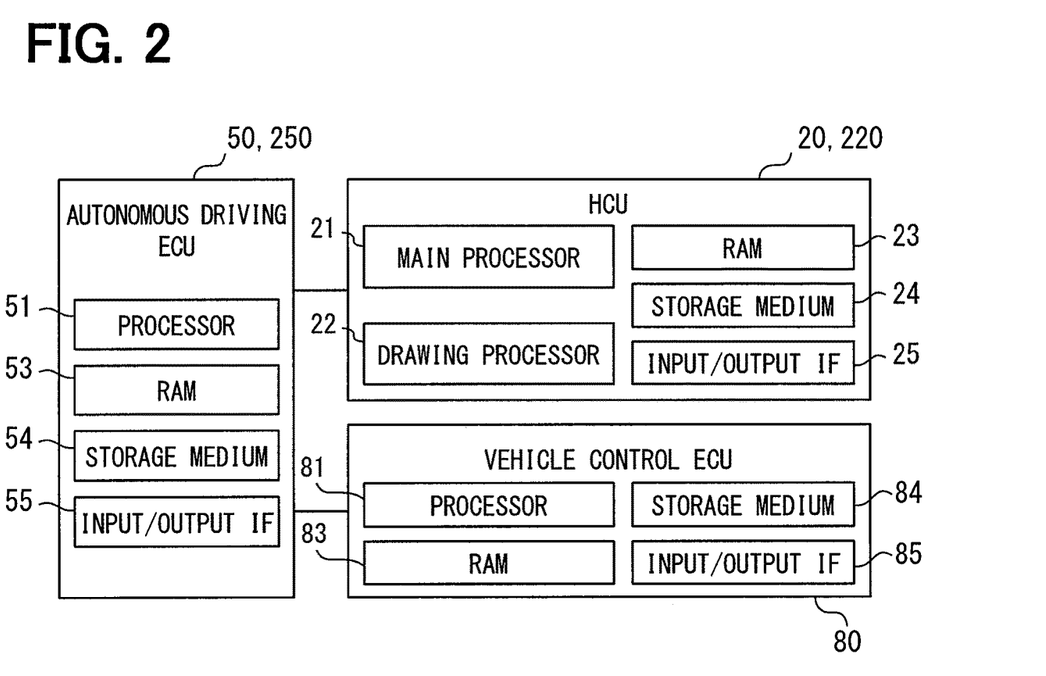
FIG. 2 is a diagram illustrating an example of a specific configuration of the autonomous driving ECU, the HCU, and the vehicle control ECU.

A function of a driving change control device according to a first embodiment of the present disclosure is implemented by an autonomous driving ECU 50 illustrated in FIGS. 1 and 2. The autonomous driving electronic control unit (ECU) 50 is mounted on a vehicle A together with electronic control units including a human machine interface (HMI) control unit (HCU) 20 and a vehicle control ECU 80. The autonomous driving ECU 50, the HCU 20, and the vehicle control ECU 80 are electrically connected to each other and capable of communicating with each other. The vehicle A is equipped with an autonomous driving function by the operations of the autonomous driving ECU 50 and the vehicle control ECU 80.

The HCU 20 integrally controls acquisition of operation information input by a driver and information presentation to the driver. The HCU 20 is mainly composed of a microcomputer which includes a main processor 21, a drawing processor 22, a RAM 23, a storage medium 24, and an input/output interface 25. The HCU 20 is electrically connected to a plurality of alert devices 10 which notifies the driver of information and a plurality of detection devices 15 which detects a state of the driver.

Each of the alert devices 10 notifies occupants of the vehicle A including the driver of various pieces of information relating to the vehicle A on the basis of an alert control signal output by the HCU 20. The alert device 10 may be previously mounted on the vehicle A, or carried into a vehicle cabin by the occupant of the vehicle A so as to be temporarily mounted on the vehicle A. The alert devices 10 include a speaker 12, a head-up display (HUD) device 13, and a touch sense presentation device 14.

The speaker 12 gives the driver or the like an alert through the sense of hearing by reproducing an alert sound or a message voice inside the vehicle cabin. The HUD device 13 gives the driver an alert through the sense of sight by forming a virtual image in front of the driver. The touch sense presentation device 14 is, for example, a vibration device which is disposed on a steering wheel or a footrest whose attitude is changeable. The touch sense presentation device 14 gives the driver an alert through the sense of touch.

Each of the detection devices 15 successively outputs, as driver detection signals, detection results relating to a driving state of the driver to the HCU 20. The detection devices 15 include a steering sensor 16 and a driver status monitor (DSM) 17.

The steering sensor 16 is a sensor that detects a grasp on the steering wheel or a sensor that detects a steering torque input to the steering wheel. The steering sensor 16 detects, as a driver detection signal, whether the driver can input a steering operation.

The DSM 17 includes a near-infrared light source, a near-infrared camera, and a control unit which controls the near-infrared light source and the near-infrared camera. The DSM 17 captures an image of the face of the driver with near-infrared light applied by the near-infrared light source using the near-infrared camera. The DSM 17 extracts, for example, the direction of the face of the driver and an opening state of the eyes of the driver from the captured image to detect, as a driver detection signal, looking-aside, a reduction in an awakening degree, and a rise in a careless degree in the driver.

The HCU 20 constructs an input processing unit 32 and an output processing unit 32 as functional blocks by executing an alert control program stored in the storage medium 24 by each of the processors 21, 22.

The input processing unit 31 acquires a driver detection signal detected by the detection device 15. The input processing unit 31 performs, for example, level classification of the awakening degree of the driver, level classification of the careless degree of the driver, and determination whether the driver is in a driving posture on the basis of the acquired driver detection signal. The input processing unit 31 successively outputs, as driver information items, awakening degree information, careless degree information, and driving posture information to the autonomous driving ECU 50.

The output processing unit 32 generates an alert control signal on the basis of HMI control information acquired from the autonomous driving ECU 50. The output processing unit 32 successively outputs generated alert control signals to the alert device 10 to enable information presentation to the driver in cooperation with the autonomous driving ECU 50.

The vehicle control ECU 80 is electrically connected to an onboard actuator group 90 which is mounted on the vehicle A. The onboard actuator group 90 includes, for example, a throttle actuator, an injector, a brake actuator, a motor generator for driving, and a steering actuator. The vehicle control ECU 80 integrally controls acceleration and deceleration and steering of the vehicle A by a control signal output to the onboard actuator group 90.

The vehicle control ECU 80 is mainly composed of a microcomputer which includes a processor 81, a RAM 83, a storage medium 84, and an input/output interface 85. The vehicle control ECU 80 constructs an actuator control unit 80a as a functional block relating to vehicle control by executing a vehicle control program stored in the storage medium 84 by the processor 81.

The actuator control unit 80a generates a control signal output to the onboard actuator group 90 from the vehicle control ECU 80. The actuator control unit 80a acquires vehicle control information from the autonomous driving ECU 50 in a state in which the autonomous driving function is active and generates a control signal based on the vehicle control information. Further, the actuator control unit 80a generates a control signal corresponding to a driving operation input by the driver in a state in which the autonomous driving function is inactive and outputs the generated control signal to the onboard actuator group 90.

The autonomous driving ECU 50 is electrically connected to a GNSS receiver 71, a lidar 72, a millimeter wave radar 73, a camera unit 74, a map database 75, a V2X receiver 76, and the like. The autonomous driving ECU 50 acquires information relating to a travel environment around the own vehicle, the information being required for autonomous driving, from these elements (71 to 76).

The global navigation satellite system (GNSS) receiver 71 receives positioning signals from a plurality of artificial satellites. The GNSS receiver 71 measures the current position of the vehicle A on the basis of the received positioning signals. The GNSS receiver 71 successively outputs the measured positional information of the vehicle A to the autonomous driving ECU 50.

The lidar 72, the millimeter wave radar 73, and the camera unit 74 are autonomous sensors each of which detects moving objects such as a pedestrian and another vehicle and also stationary objects such as a fallen object on a road, a traffic light, a guard rail, a curb, a road sign, a road marking, and a lane marking. Each of the lidar 72, the millimeter wave radar 73, and the camera unit 74 successively outputs detected object information relating to detected moving and stationary objects to the autonomous driving ECU 50. A detection range capable of acquiring detected object information is set to cover the whole circumference of the vehicle A, that is, 360° by a combination of the lidar 72, the millimeter wave radar 73, and the camera unit 74.

A plurality of lidars 72 are mounted on the vehicle A. Each of the lidars 72 emits a laser beam in a traveling direction of the vehicle A, right and left directions, or a rear direction, and receives the laser beam reflected by a moving object or a stationary object present in each direction to acquire detected object information. The millimeter wave radar 73 emits a millimeter wave in the traveling direction of the vehicle A and receives the millimeter wave reflected by a moving object or a stationary object present in the traveling direction to acquire detected object information. The millimeter wave radar 73 is capable of detecting a more distant object than the lidar 72 is.

The camera unit 74 includes a front camera which captures an image of a front region in front of the vehicle A, side cameras which capture images of right and left side regions, a rear camera which captures an image of a rear region, and an image processor which analyzes the front region image captured by each of the cameras. Each of the cameras may be either a monocular camera or a compound-eye camera. The camera unit 74 extracts a moving object or a stationary object included in each of the images in the front region, the right and left side regions, and the rear region to acquire detected object information.

The map database 75 is a storage medium that stores many pieces of map data therein. The map data includes structure information such as the curvature, the gradient, the length of a section of each road, and non-temporary traffic regulation information such as a speed limit and one-way traffic. The map database 75 causes the autonomous driving ECU 50 to acquire map data around the current position of the vehicle A and in the traveling direction of the vehicle A.

The V2X receiver 76 exchanges information with an onboard communication device which is mounted on another vehicle and a roadside device which is installed on the road side by wireless communication. The V2X receiver 76 receives temporary traffic regulation information, congestion information, and weather information by vehicle-to-vehicle communication with the onboard communication device and road-to-vehicle communication with the roadside device and successively outputs the received information items to the autonomous driving ECU 50. The temporary traffic regulation information includes, for example, information of lane regulation and road closure which occur on a road in the traveling direction of the vehicle A due to an accident or a construction work. The congestion information includes, for example, information of the degree of traffic congestion, that is, the presence or absence of a traffic jam and a range of a traffic jam, and the condition of traffic flow (e.g., a traveling speed) on a road in the traveling direction. The weather information includes, for example, information of the amount of rainfall, the amount of snowfall, and the occurrence of fog on a road in the traveling direction.

The autonomous driving ECU 50 performs acceleration/deceleration control and steering control for the vehicle A in cooperation with the vehicle control ECU 80 to exhibit the autonomous driving function capable of performing a driving operation of the vehicle A on behalf of the driver. The autonomous driving ECU 50 is mainly composed of a microcomputer which includes a processor 51, a RAM 53, a storage medium 54, and an input/output interface 55. The autonomous driving ECU 50 is capable of executing an autonomous driving program stored in the storage medium 54 by the processor 51. The autonomous driving ECU 50 constructs a travel environment recognition unit 61, a travel plan generation unit 62, a driving change control unit 63, an ECU communication unit 64, and an HCU communication unit 65 as functional blocks relating to autonomous driving on the basis of the autonomous driving program.

The travel environment recognition unit 61 recognizes a travel environment of the vehicle A by combining positional information acquired from the GNSS receiver 71, detected object information acquired from each of the autonomous sensors, and map data acquired from the map database 75 with each other. In particular, the travel environment recognition unit 61 recognizes the shape and a moving state of an object around the vehicle A within a detection range of each of the autonomous sensors on the basis of a result of the integration of pieces of detected object information and combines the recognized result with positional information and map data to generate a virtual space that three-dimensionally reproduces an actual travel environment.

The travel plan generation unit 62 generates a travel plan for causing the vehicle A to automatically travel by the autonomous driving function on the basis of the travel environment recognized by the travel environment recognition unit 61. The travel plan includes a long and medium-term travel plan and a short-term travel plan.

The long and medium-term travel plan defines a route to a destination of the vehicle A set by the driver. The route defined by the long and medium-term travel plan extends to a position outside the detection range of each of the autonomous sensors. The long and medium-term travel plan reflects structure information and non-temporary traffic regulation information included in the map data and temporary traffic regulation information received in the V2X receiver 76.

The short-term travel plan defines a scheduled travel track for achieving traveling following the long and medium-term travel plan using the virtual space around the vehicle A generated by the travel environment recognition unit 61. In the short-term travel plane, specifically, the execution of steering for a lane change, acceleration and deceleration for speed control, quick braking for avoiding collision, and the like is determined.

The driving change control unit 63 controls switching of control relating to a driving operation between the autonomous driving function and the driver. The driving change control unit 63 starts the operation of the autonomous driving function upon detecting a switching operation to autonomous driving by the driver in an autonomous driving possible area. Further, the driving change control unit 63 refers to a long and medium-term travel plan and performs switching from autonomous driving to manual driving by the driver as planned before the end of the autonomous driving possible area. The driving change control unit 63 performs switching from autonomous driving to manual driving also when it becomes difficult for the travel environment recognition unit 61 to recognize a travel environment accidentally or unexpectedly, and it is thus difficult for the travel plan generation unit 62 to generate a short-term travel plan.

The driving change control unit 63 adjusts the details of a driving change control process relating to a planned transfer of the driving operation so that the driver smoothly receives the driving operation. Specifically, the driving change control unit 63 acquires shape information of a road where the vehicle A is scheduled to travel by the autonomous driving function by referring to the long and medium-term travel plan, selects a section that is substantially straight and is less inclined while avoiding a previously defined high driving load section, and transfers the driving operation to the driver. The high driving load section has a road shape that increases the driving load when the driver drives thereon. For example, a curve section and a rising gradient section are defined as the high driving load sections. Further, a section in which localized heavy rain or fog occurs is also defined as the high driving load section on the basis of weather information. In addition, a section in congestion where it is difficult to secure a sufficient inter-vehicular distance is also set as the high driving load section on the basis of congestion information.

The ECU communication unit 64 performs a process of outputting information to the vehicle control ECU 80 and a process of acquiring information from the vehicle control ECU 80. Specifically, the ECU communication unit 64 generates vehicle control information corresponding to a scheduled travel track formulated by the travel plan generation unit 62 and successively outputs the generated vehicle control information to the vehicle control ECU 80 together with operation information indicating whether the autonomous driving function is active. Further, the ECU communication unit 64 is capable of successively acquiring state information indicating a control state of the onboard actuator group 90 from the vehicle control ECU 80 and correcting the details of the vehicle control information.

The HCU communication unit 65 performs a process of outputting information to the HCU 20 and a process of acquiring information from the HCU 20. Specifically, the HCU communication unit 65 acquires driver information from the HCU 20. Further, the HCU communication unit 65 generates HMI control information relating to switching of driving to the driver and successively outputs the generated HMI control information to the HCU 20 together with operation information indicating whether the autonomous driving function is active. The HCU communication unit 65 is capable of appropriately presenting information relating to a driving change to the driver by controlling the alert device 10 in cooperation with the HCU 20.

Figure 3:
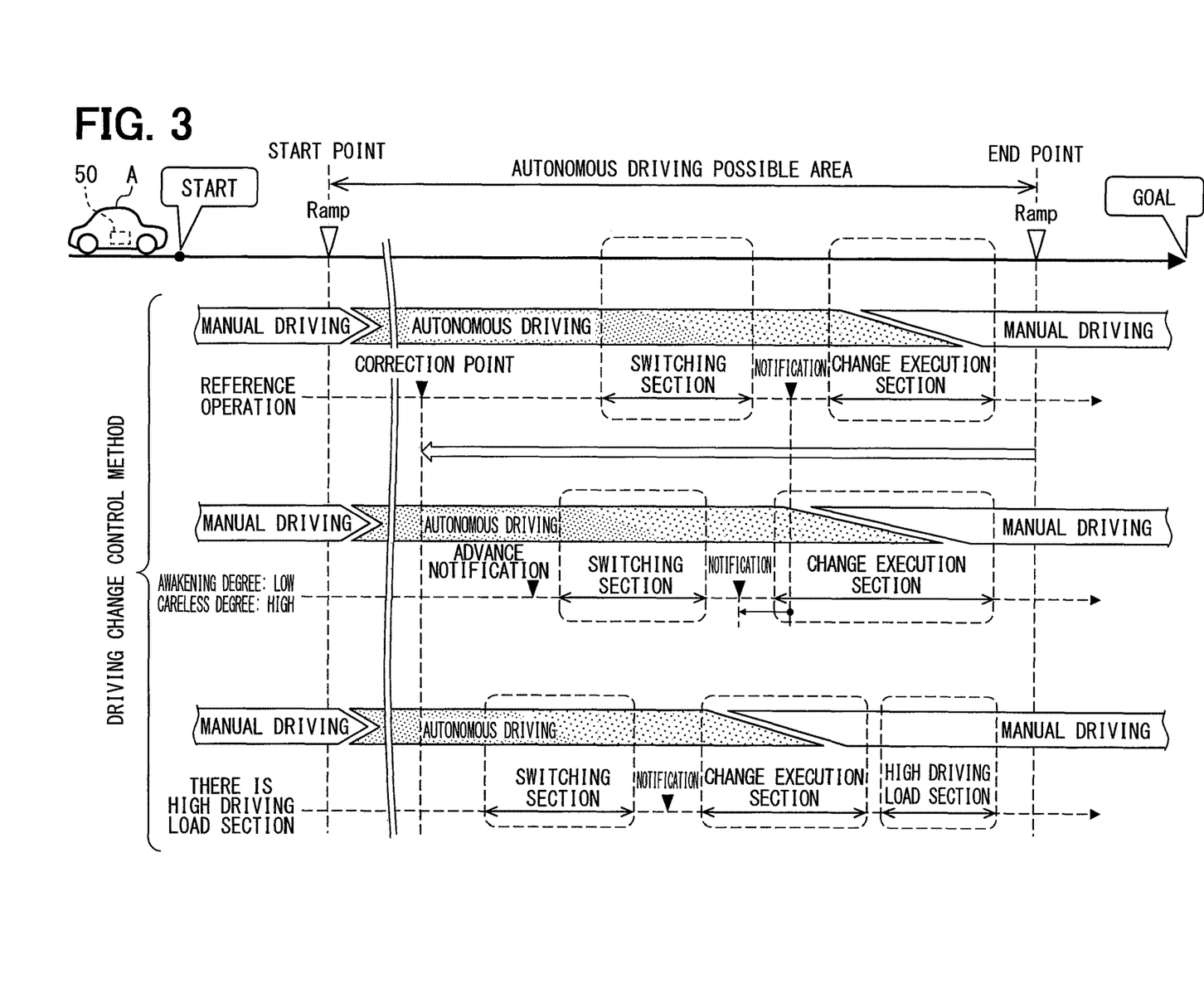
FIG. 3 is a diagram illustrating a time line describing the details of a driving change control method on a time-series basis.

Next, the details of a series of processes of a driving change control method for changing driving from the autonomous driving function to the driver by the configuration described above will be described with reference to FIG. 3, and further to FIG. 1. FIG. 3 illustrates an example of so-called ramp-to-ramp autonomous driving. Specifically, in the autonomous driving illustrated in FIG. 3, an autonomous driving possible area is set on an expressway which is present on a route to a destination, and a start point and an end point of the autonomous driving possible area are set on rampways connected to a main through lane of the expressway.

The driving change control unit 63 sets a traveling state for driving switching in addition to a traveling state for cruising and starts driving switching after shifting the vehicle A to the traveling state for driving switching in advance. For such driving switching, the driving change control unit 63 formulates a plan of a driving change control process (hereinbelow, referred to as a "change plan") which is scheduled to be performed before the rampway that is set as the end point after the start of autonomous driving. In the change plan, a change execution section, a switching section, a driving change notification timing, the necessity or unnecessity and a timing of an advance change notification, and a correction point where the details of the change plan are corrected are set.

In the change execution section, the driving operation is transferred from the autonomous driving function to the driver. The change execution section is set on the main through lane or a deceleration lane immediately before the exit to the rampway that is set as the end point. The driving change control unit 63 sets a start position of the change execution section with respect to the end point and the length of the change execution section. Further, when the main through lane immediately before the exit to the rampway is a high driving load section, the driving change control unit 63 avoids the high driving load section and sets the change execution section in a straight section before the high driving load section (refer to the bottom of FIG. 3).

In the switching section, a traveling state of the vehicle A is adjusted. The traveling state of the vehicle A is adjusted to a low driving load state when it is assumed that the driver is performing the driving operation. The traveling state after the switching section is a state with a lower driving load (a low driving load mode) than a state during cruise control before arrival at the switching section (a normal traveling mode). The switching section is set on the route in the long and medium-term travel plan before the change execution section. The driving change control unit 63 sets a start position of the switching section with respect to the end point and the length of the switching section. In FIG. 3, a range of the normal traveling mode is indicated by dense dots, and a range of the low driving load mode is indicated by sparse dots.

In the switching section, in order to adjust the traveling state, a travel control parameter which is referred to by the autonomous driving function is changed. Specifically, the travel plan generation unit 62 changes the travel control parameter which is used in formulating a short-term travel plan. For example, when the vehicle A cruises alone at a constant speed before the switching section, a target speed of the vehicle A in the constant-speed cruising is set as the travel control parameter. The travel plan generation unit 62 generates a scheduled travel track that adjusts a value of the target speed to a low value in the switching section. As a result, the driver can receive the driving operation in a low driving load state in which the traveling speed is lowered in the change execution section after the switching section.

The value of the target speed in the constant-speed cruising described above is desirably determined taking into consideration the form of a road where the vehicle A is scheduled to travel after a change to manual driving. Specifically, when the vehicle A travels on a curve having a large curvature after the change to manual driving, the target speed is preferably set lower than the target speed in a case where a road after the driving change is a straight road.

As an example, the value of the target speed is the mean value of two speed values. A cruising speed during automatic traveling before the arrival at the switching section or a speed limit on a road where the vehicle A is currently traveling is used as a larger one of the two speed values. On the other hand, a speed limit on a road where the vehicle A travels after the driving change (e.g., a road after the passage through the rampway) or a recommended traveling speed which is calculated by the travel plan generation unit 62 for the road where the vehicle A travels after the driving change is used as a smaller one of the two speed values. When the mean value of these two speed values is higher than the minimum speed on the current traveling road, the mean value is set as the target speed. When the mean value is lower than the minimum speed, the minimum speed or a value obtained by adding a predetermined value to the minimum speed is set as the target speed. For example, when the cruising speed or the speed limit during automatic traveling is 100 km/h and the speed limit or the recommended traveling speed after the passage through the rampway is 40 km/h, the vehicle A is gradually decelerated to approximately 70 km/h which is the mean value of these values in the switching section defined in, for example, a deceleration lane.

When the vehicle A performs following traveling before the switching section, for example, a target inter-vehicular distance between the vehicle A and the preceding vehicle is set as one of the travel control parameters. The travel plan generation unit 62 generates a scheduled travel track that adjusts a value of the target inter-vehicular distance to a large value in the switching section. As a result, in the change execution section after the switching section, the driver can receive the driving operation in a low driving load state in which a long inter-vehicular distance to the preceding vehicle is secured. The travel control parameter adjusted in the switching section may be a time headway.

Further, a maximum value of an allowable relative speed of the vehicle A with respect to the preceding vehicle in following traveling, that is, a target relative speed with respect to the preceding vehicle may be set as one of the travel control parameters adjusted in the switching section. The travel plan generation unit 62 adjusts the maximum value of the relative speed to a small value (e.g., zero or a negative value) in the switching section. Thus, the value of the target relative speed is set in such a manner that the relative speed with respect to the preceding vehicle becomes zero or the vehicle A is gradually separated from the preceding vehicle in the switching section. As a result, an approach of the vehicle A to the preceding vehicle is prevented in the change execution section after the switching section. Thus, the driver is less likely to feel that the preceding vehicle is a burden.

In addition, when a road where the vehicle A travels includes a plurality of lanes, a lane where the autonomous driving function causes the vehicle A to travel is selected on the basis of lane designation information set in the long and medium-term travel plan. The lane designation information which designates the lane is also one of the travel control parameters adjustable in the switching section.

Specifically, the travel environment recognition unit 61 is capable of recognizing the degree of congestion in each lane around the vehicle A and in the traveling direction of the vehicle A using detected object information and congestion information before the switching section, and making a search for an uncrowded lane having a small number of other vehicles. When the travel environment recognition unit 61 has found another lane that is less crowded than the current traveling lane, the lane designation information is updated so that the vehicle A travels on the uncrowded lane, and the travel plan generation unit 62 generates a scheduled travel track for a lane change to the uncrowded lane. As a result, the driver can receive the driving operation in a low driving load state on the least crowded one of the plurality of lanes in the change execution section after the switching section.

An actual operating speed on a passing lane is likely to be higher than an actual operating speed on a driving lane. Thus, a lane change from a driving lane to a passing lane increases the traveling speed, which results in an increase in the driving load. Thus, even when the travel environment recognition unit 61 recognizes that a passing lane is less crowded than a driving lane, a lane change from the driving lane to the passing lane is not performed. A lane change to an uncrowded lane in the switching section is limited to a lane change to a driving lane. That is, the driving load is lowered by a lane change to a lane that is less crowded and has a lower actual operating speed than the current traveling lane. When a first driving lane and a second driving lane are set, movements in both directions between the first driving lane and the second driving lane may be allowed according to the degree of congestion in each of the driving lanes.

The mode of the travel control parameter adjustment as described above differs between when there is a following vehicle behind the vehicle A and when there is no following vehicle. Specifically, when there is a following vehicle, the mode of the travel control parameter adjustment is changed so that a deceleration generated in the vehicle A in the switching section becomes smaller than a deceleration generated in the vehicle A when there is no following vehicle. As a result, a rapid approach to the following vehicle is prevented.

The control for adjusting the travel control parameter to a low driving load state as described above can be stopped according to a state of the driver and a traveling state of the vehicle A. When the driving change control unit 63 determines that execution conditions for the travel control parameter adjustment are not satisfied, the driving change control unit 63 can start a driving change without performing the control for adjusting the speed or the like to a low driving load state.

One of the execution conditions for the travel control parameter adjustment described above is a state of the awakening degree and a state of the careless degree in the driver. Specifically, when the awakening degree of the driver based on awakening degree information is higher than a previously set threshold or when the careless degree of the driver based on careless degree information is lower than a previously set threshold, the travel control parameter adjustment to a low driving load state is stopped.

In addition, another one of the execution conditions is an elapsed time after a driving change from the driver to the autonomous driving function. It is estimated that the careless degree of the driver is maintained in a sufficiently low state, and the awakening degree is also maintained in a sufficiently high state immediately after the driving change to the autonomous driving function. Thus, the driving change control unit 63 measures an elapsed time after the driving change to the autonomous driving function. When the elapsed time is less than a threshold time (e.g., approximately 30 minutes), the driving change control unit 63 determines that the execution condition is not satisfied and omits the control for the adjustment to a low driving load state.

Further, another one of the execution conditions is a traveling speed of the vehicle A before arrival at the switching section. The driving change control unit 63 stops the travel control parameter adjustment to a low driving load state when the current traveling speed of the vehicle A is lower than a speed threshold speed (approximately 40 km/h) on the basis of vehicle speed information obtained by detecting the traveling speed. The above configuration prevents the driving load which is already in a sufficiently low state from being controlled to an excessively low state when the vehicle A travels at a low speed due to, for example, a traffic jam.

A notification of a driving change (hereinbelow, referred to as a "change notification") is information presentation that notifies the driver of the execution of a transfer of a driving operation from the autonomous driving function to the driver, more strictly, the start of the transfer. For example, the change notification requests the driver to take a posture suitable for the driving operation. The change notification is performed to the driver by control of the alert device 10 by the HCU communication unit 65 and the HCU 20. A timing of the driving change notification is set at the timing after the completion of an adjustment of the traveling state of the vehicle A with a change of the travel control parameter and before arrival at the change execution section. According to the above setting, the driving change notification is not started when the behavior of the vehicle A is in a transient state.

A mode of the change notification can be changed according to a state of the driver, specifically, the awakening degree and the careless degree of the driver. For example, the driving change control unit 63 advances the change notification start timing from a reference operation timing with respect to the timing when the vehicle A arrives at the change execution section as the awakening degree of the driver becomes lower or the careless degree of the driver becomes higher. The advancement of the change notification secures a longer change execution section than the change execution section in the reference operation (refer to the middle of FIG. 3). Thus, the driver can receive the driving operation with sufficient time. Further, when the change notification timing is advanced, the switching section is also changed to a range before the change execution section.

An allowance time from the start of the change notification to the arrival at the change execution section may be secured longer than an allowance time in the reference operation by the advancement of the change notification. Such a process enables the driver to recover the awakening degree or reduce the careless degree using the allowance time and receive the driving operation in a state suitable for driving.

The driving change control unit 63 uses more alert devices 10 in the change notification as the awakening degree of the driver becomes lower or the careless degree of the driver becomes higher. Further, the driving change control unit 63 is capable of increasing the number of notifications, increasing a display size of a virtual image, increasing the volume of a notification voice, and increasing the intensity of vibrations as the awakening degree of the driver becomes lower or the careless degree of the driver becomes higher.

An advance notification of a driving change (hereinbelow, referred to as an "advance change notification") is information presentation that notifies the driver in advance of the execution of a transfer of a driving operation from the autonomous driving function to the driver. The advance change notification is performed by, for example, a message voice by the speaker 12 or a virtual display by the HUD device 13. A timing of the advance driving change notification is set at the timing before the arrival at the switching section. The necessity or unnecessity of the advance change notification is determined according to a state of the driver, specifically, the awakening degree and the careless degree of the driver. For example, when the awakening degree of the driver is lower than a previously set threshold or when the careless degree of the driver is higher than a previously set threshold, the advance change notification is performed. On the other hand, when the awakening degree of the driver is higher than the predetermined threshold and the careless degree of the driver is lower than the predetermined threshold, the advance change notification is omitted so as not to give the driver a troublesome feeling.

The correction point is set, for example, before the rampway as the end point by a predetermined distance or a predetermined time. At the correction point, the driving change control unit 63 acquires the latest driver information. The driving change control unit 63 mainly determines the change notification timing and the necessity or unnecessity of the advance change notification on the basis of the acquired driver information to finalize a detailed schedule of a series of change plans. The position of the correction point with respect to the end point may be appropriately changed according to the presence or absence of a high driving load section.

Figure 4:
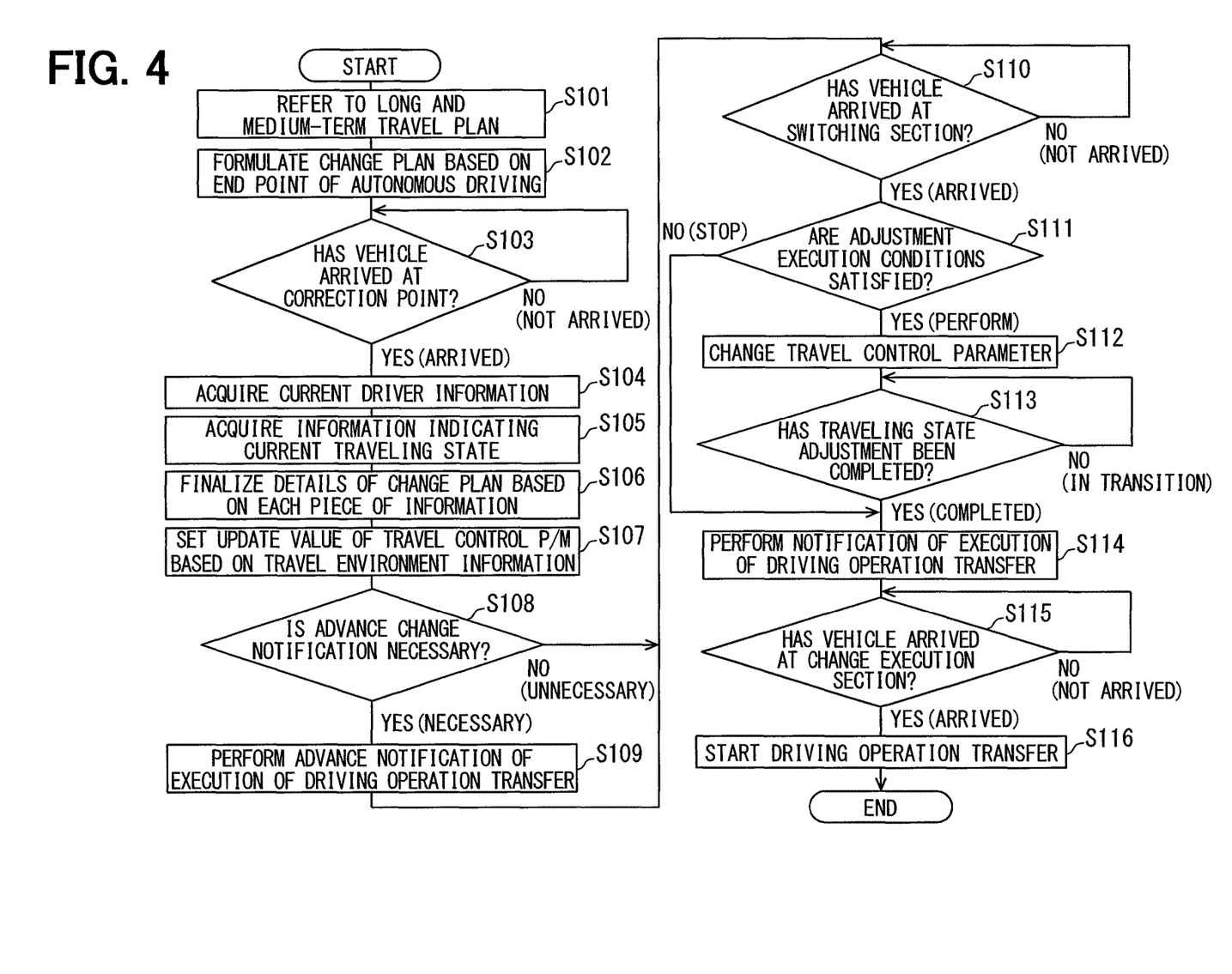
FIG. 4 is a flowchart illustrating the details of a driving change control process performed by the autonomous driving ECU.

The flow of the driving change control process based on the details described above will be described with reference to a flowchart illustrated in FIG. 4, and further to FIGS. 1 and 3 on a time-series basis. The driving change control process of FIG. 4 is started by the autonomous driving ECU 50 when the driver approves the actuation of the autonomous driving function.

In S101, a long and medium-term travel plan is referred to in order to acquire information of the position of an end point of an autonomous driving possible area and shape information of a road to be a change execution section. Then, the process proceeds to S102. In S102, a change plan based on the end point which is shown in the long and medium-term travel plan referred to in S101 is formulated. Then, the process proceeds to S103. In S102, the positions of the change execution section, a switching section, and a correction point are set with respect to the end point.

In S103, it is repeatedly determined whether the vehicle A has arrived at the correction point set in S102 on the basis of positional information from the GNSS receiver 71 to wait for arrival at the correction point. Then, upon the arrival of the vehicle A at the correction point, the process proceeds to S104. In S104, the current (latest) driver information relating to the driver is acquired. Then, the process proceeds to S105. In S105, information indicating the current traveling state of the vehicle A, and the latest weather information and the latest congestion information in and near the change execution section are acquired. Then, the process proceeds to S106.

In S106, the details of the change plan formulated in S102 are finalized on the basis of each of the pieces of information acquired in S104 and S105. Specifically, in S106, ranges of the change execution section and the switching section, the necessity or unnecessity of an advance change notification, and the timing of a change notification are determined. Then, the process proceeds to S107. In S107, travel control parameters to be adjusted in the switching section and an update value of each of the travel control parameters are determined on the basis of the traveling state of vehicle A acquired in S105. Then, the process proceeds to S108.

In S108, it is determined whether to perform S109 on the basis of the necessity or unnecessity of an advance change notification determined in S106. When no advance change notification is necessary, S109 is skipped. On the other hand, when an advance change notification is necessary, an advance notification of a driving change using the alert device 10 is performed by outputting HMI control information to the HCU 20 in S109. Then, the process proceeds to S110.

In S110, it is repeatedly determined whether the vehicle A has arrived at the switching section set in S106 on the basis of positional information from the GNSS receiver 71 to wait for arrival at the switching section. Then, upon the arrival of the vehicle A at the switching section, the process proceeds to S111. In S111, it is determined whether execution conditions for the travel control parameter adjustment are satisfied. When control for reducing the driving load is not required, and it is determined that the execution conditions are not satisfied in S111, the travel control parameter adjustment is stopped. Then, the process proceeds to S114. On the other hand, when it is determined that the execution conditions are satisfied in S111, the process proceeds to S112 to change the travel control parameters.

In S112, a value of each travel control parameter which is determined to be an adjustment target in S107 is changed. Then, the process proceeds to S113. The traveling state of the vehicle A transitions to a low driving load state by S112. In S113, the completion of the adjustment of the traveling state based on the change process in S112 is waited for. Upon the completion of the adjustment, the process proceeds to S114.

In S114, the alert device 10 is controlled in accordance with the start timing determined in S106 to inform the driver of the execution of the transfer of the driving change. Then, the process proceeds to S115. In S115, it is repeatedly determined whether the vehicle A has arrived at the change execution section set in S106 on the basis of positional information from the GNSS receiver 71 to wait for arrival at the change execution section. Then, upon the arrival of the vehicle A at the change execution section, the process proceeds to S116. In S116, the transfer of the driving operation from the autonomous driving function to the driver is started, and a series of driving change control processes is finished.

In the first embodiment described above, the travel control parameter is changed in the switching section which is set before the change execution section, so that the traveling state of the vehicle A is adjusted to a low driving load state. Thus, the driving operation is transferred from the autonomous driving function to the driver in the low driving load state in or near the change execution section. The driving change control as described above eases the anxiety of the driver when the driver receives the driving operation from the autonomous driving function.

The above configuration prevents the occurrence of a scene in which the driver whose sense of driving has not sufficiently recovered has to restart driving at a speed higher than 100 km per hour and a scene in which the driver has to restart driving with a short inter-vehicular distance. As a result, the stability of the driving operation by the driver is easily secured after the driving change. Thus, the driver can smoothly restart driving.

In addition, the driving change notification in the first embodiment is performed after the completion of the transition of the traveling state of the vehicle A in the switching section, and thus does not overlap a transient period of the traveling state. This prevents the adjustment of the traveling state from the normal traveling mode to the low driving load mode for the purpose of reducing the driving load during the driving switching from giving the driver who receives the driving operation anxiety on the contrary.

Further, in the first embodiment, as the awakening degree becomes lower and the careless degree becomes higher, the start timing of the change notification is advanced to secure a longer change execution section. As a result, errors of the driver, such as a reaction delay and failing to hear the notification, are more likely to be allowed in the change execution section. According to the above configuration, the driver can receive the driving operation with emotional stability in the change execution section.

Further, in the first embodiment, when the awakening degree of the driver is lower than the threshold and when the careless degree of the driver is higher than the threshold, the advance change notification is performed to the driver before the arrival at the switching section. Thus, the driver can recover the awakening degree or reduce the careless degree in the switching section. As a result, the driver can face the change execution section and receive the driving operation in a state suitable for driving.

Further, in the first embodiment, when the driver is in a state suitable for the driving change, the change notification timing is delayed and the advance change notification is omitted. This prevents a too-early change notification and a redundant change notification from giving the driver a troublesome feeling.

In addition, in the first embodiment, when the awakening degree of the driver is higher than the threshold or when the careless degree of the driver is lower than the threshold, the travel control parameter adjustment of to a low driving load state is stopped. As described above, when the awakening degree is high or when the careless degree is low, the driver can receive the driving operation from the autonomous driving function without feeling serious anxiety even when the driving load is not adjusted to a low state. As described above, when the control for previously adjusting the driving load to a low load is stopped according to the state of the driver, it is possible to smoothly perform the driving change to the driver who can reliably take over the driving operation without giving the driver a troublesome feeling.

Further, in the first embodiment, also when the elapsed time after the driving change to the autonomous driving function is short, the travel control parameter adjustment is stopped. In this case, it can be estimated that the careless degree of the driver is sufficiently low and that the awakening degree of the driver is sufficiently high. Thus, when an execution time of autonomous driving is relatively short, the control for the adjustment to a low driving load state may be omitted.

Further, in the first embodiment, when the traveling speed of the vehicle A is lower than the threshold speed due to a factor such as a traffic jam, the travel control parameter adjustment is stopped. As described above, in a scene in which the driving load is already low, the control for further reducing the driving load may not be performed. The stoppage of the control prevents an excessive reduction in the driving load. Thus, it is possible to perform the driving change without giving the driver a troublesome feeling.

In addition, the change execution section in the first embodiment is set outside a high driving load section. Thus, the driving change to the driver is performed in a state in which not only a driving load caused by the traveling state of the vehicle A, but also a driving load caused by a road environment is low. According to the above configuration, it is possible to prevent the occurrence of a scene in which the driver has to start a difficult driving operation with a poor sense of driving. Thus, the anxiety of the driver when the driver receives the driving operation is more reliably eased.

Further, the traveling state for driving switching in the first embodiment can be differently set between a scene in which the vehicle A travels alone and a scene in which there is another vehicle, such as a preceding vehicle, around the vehicle A. For example, in the scene in which the vehicle A travels alone, the traveling speed of the vehicle A is reduced in the switching section. As a result, a driving load felt by the driver in the change execution section can be reliably reduced.

On the other hand, in the scene in which there is a preceding vehicle, the inter-vehicular distance to the preceding vehicle is maintained or increased in the switching section. As a result, a pressure put on the driver by the preceding vehicle in the change execution section can be reliably reduced. Similarly, when the maximum value of the allowable relative speed in the switching section is adjusted to a low value, the vehicle A is gradually separated from the preceding vehicle. Thus, the driver can receive the driving operation without being excessively conscious of the preceding vehicle.

Further, in the first embodiment, a lane change to an uncrowded lane can be performed in the switching section. As described above, when the vehicle A moves to an uncrowded lane in advance, the driver can receive the driving operation without being excessively conscious of another vehicle traveling around the vehicle A.

In addition, in the first embodiment, when there is a following vehicle behind the vehicle A, the mode of the travel control parameter adjustment is changed so as to reduce the deceleration generated in the vehicle A in the switching section. Thus, it is possible to adjust the traveling state of the vehicle A to a low driving load state while reducing the influence on the following vehicle.

In the first embodiment, the autonomous driving ECU 50 corresponds to the "driving change control device". The processing unit of S101 corresponds to the "shape information acquisition unit", the processing units of S102 and S106 correspond to the "section setting unit", and the processing unit of S104 corresponds to the "driver information acquisition unit" in the autonomous driving ECU 50. Further, the processing units of S109 and S114 correspond to the "alert control unit" and the processing unit of S112 corresponds to the "parameter adjustment unit" in the autonomous driving ECU 50.

Second Embodiment

Figure 5:
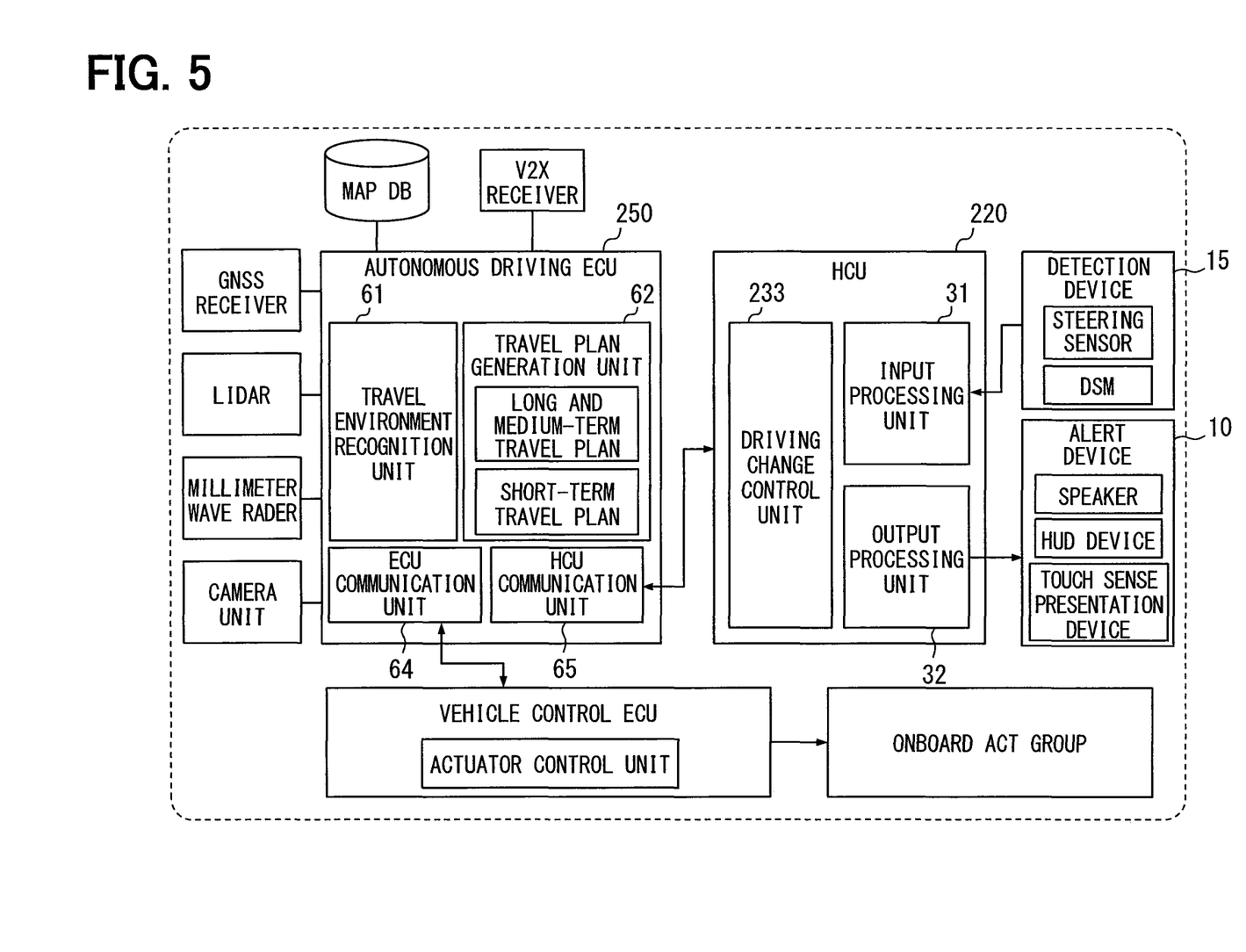
FIG. 5 is a block diagram illustrating the entire configuration of an autonomous driving ECU, an HCU, a vehicle control ECU, and the like in a second embodiment.

A second embodiment of the present disclosure illustrated in FIG. 5 is a modification of the first embodiment. An HCU 220 of the second embodiment constructs a driving change control unit 233 in addition to an input processing unit 31 and an output processing unit 32 which are substantially the same as those of the first embodiment by executing an alert control program by each of the processors 21, 22 (refer to FIG. 2). On the other hand, a travel environment recognition unit 61, a travel plan generation unit 62, an ECU communication unit 64, and an HCU communication unit 65 which are substantially the same as those of the first embodiment are constructed as functional blocks in an autonomous driving ECU 250.

As described above, the driving change control unit 233 constructed in the HCU 220 is capable of reliably acquiring driver information using the detection device 15 and controlling the alert device 10. In addition, the driving change control unit 233 constructed in the HCU 220 is also capable of acquiring each travel plan and travel environment information by communication with the HCU communication unit 65 and setting an update value of a travel control parameter. Thus, the driving change control unit 233 is capable of formulating a change plan based on an end point of an autonomous driving possible area. Thus, the second embodiment also achieves effects similar to the effects of the first embodiment and the anxiety of the driver when the driver receives a driving operation is eased. In the second embodiment, the HCU 220 corresponds to the "driving change control device".

Third Embodiment

Figure 6:
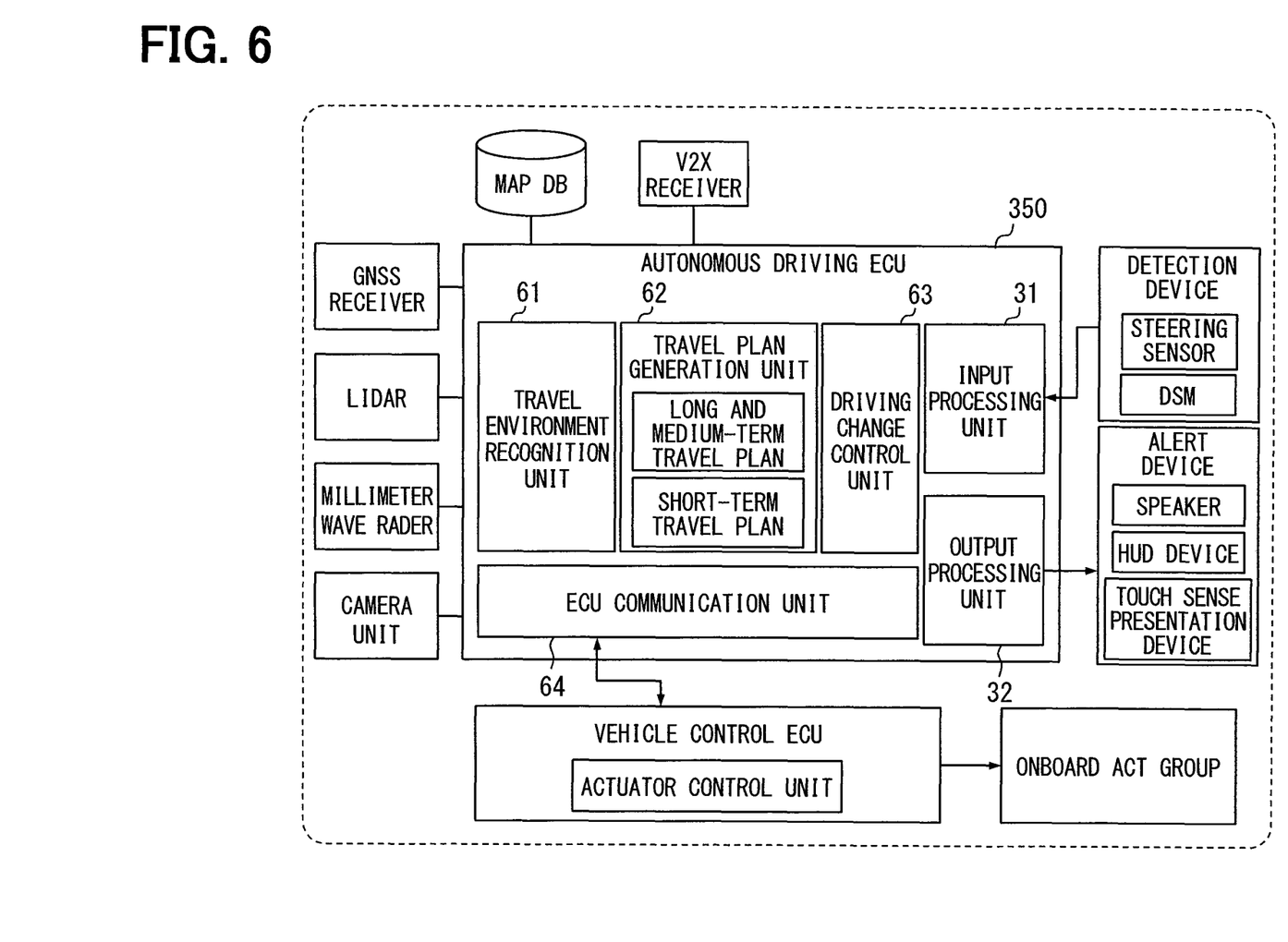
FIG. 6 is a block diagram illustrating the entire configuration of an autonomous driving ECU, a vehicle control ECU, and the like in a third embodiment.
Figure 7:
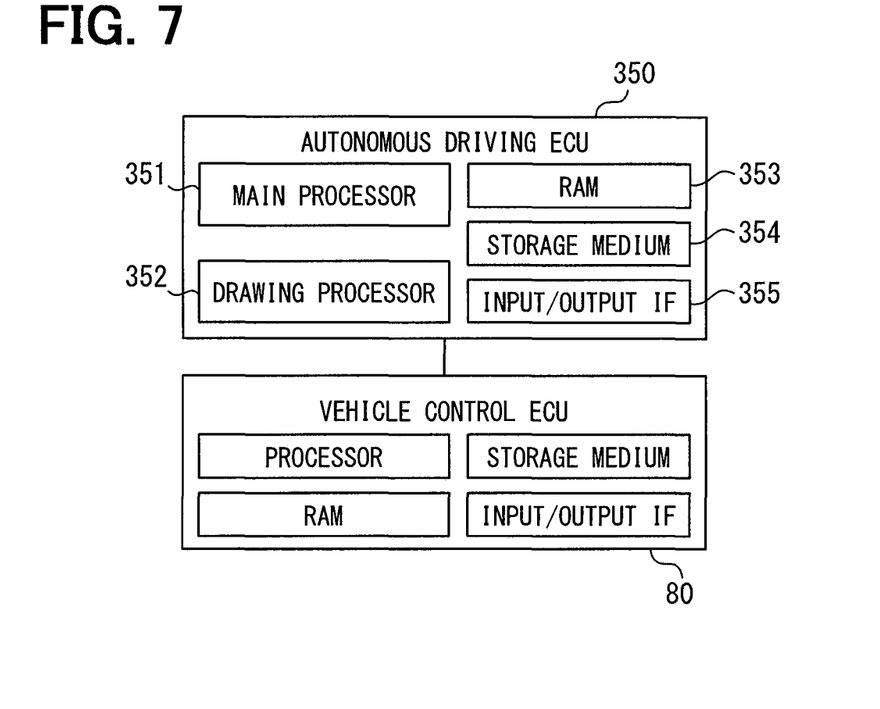

A third embodiment of the present disclosure illustrated in FIGS. 6 and 7 is another modification of the first embodiment. An autonomous driving ECU 350 of the third embodiment is an electronic control unit that serves as both the autonomous driving ECU 50 (refer to FIG. 1) and the HCU 20 (refer to FIG. 1) of the first embodiment. The autonomous driving ECU 350 implements the autonomous driving function of a vehicle A in cooperation with a vehicle control ECU 80. The autonomous driving ECU 350 is mainly composed of an onboard computer for automatic maneuvering which includes a main processor 351, a drawing processor 352, a RAM 353, a storage medium 354, and an input/output interface 355. The autonomous driving ECU 350 constructs a travel environment recognition unit 61, a travel plan generation unit 62, a driving change control unit 63, an ECU communication unit 64, an input/output processing unit 31, and an output processing unit 32, which are substantially the same as those of the first embodiment, as functional blocks relating to autonomous driving on the basis of an autonomous driving program.

As described above, the autonomous driving ECU 350 which also has the function of the HCU 20 (refer to FIG. 1) also formulates a change plan based on an end point of an autonomous driving possible area and implements a driving change in a low driving load mode with a reduced driving load. Thus, the third embodiment also achieves effects similar to the effects of the first embodiment and the anxiety of the driver when the driver receives a driving operation is eased. In the third embodiment, the autonomous driving ECU 350 corresponds to the "driving change control device".

Other Embodiments

The plurality of embodiments have been described above. However, the present disclosure is not limited to the above embodiments and can be applied to various embodiments and combinations within the range of the gist of the present disclosure.

In the transfer of control from the autonomous driving function to the driver in the above embodiments, the driving change notification is started after the completion of the transition of the traveling state of the vehicle A. However, the change notification may be started at the timing overlapping the switching section. Further, the change notification may be advanced not only when the awakening degree is low or when the careless degree is high, but also, for example, when the driver has a bad driving posture.

A time of advancing the change notification may be adjusted to be gradually longer as a value of the awakening degree classified into a plurality of levels becomes lower or a value of the careless degree classified into a plurality of levels becomes higher. Alternatively, when a value of the awakening degree classified into a plurality of levels is smaller than a predetermined threshold or when the careless degree classified into a plurality of levels is larger than a predetermined threshold, the change notification may be advanced by a certain time. Further, the awakening degree and the careless degree may be evaluated in simple two grades, such as "high" and "low" or "good" and "bad" without being classified into a plurality of levels.

In the above embodiments, each of the thresholds for evaluating the awakening degree and the careless degree can be appropriately changed. For example, an ordinary awakening degree and an ordinary careless degree of a specific driver may be recorded, and each threshold corresponding to an individual driver may be previously set. Further, each of the thresholds for the awakening degree and the careless degree may be adjusted by input by the driver. Further, the threshold time and the threshold speed for determining whether to perform switching to the low driving load mode may be adjustable by input by the driver. Further, the switching to the low driving load mode itself may be set not to be performed by input by the driver. Alternatively, the stoppage of the switching to the low driving load mode may be set not to be performed.

In the above embodiments, only when the awakening degree of the driver is low or when the careless degree of the driver is high, the advance change notification is performed. However, the advance change notification may be performed on every occasion regardless of the state of the driver. Further, the timing of the advance driving change notification may, for example, overlap the switching section as long as the timing of the advance driving change notification is earlier than the change notification timing. Further, advance change notification started before the arrival at the switching section may be continued also in the switching section. The advance notification of the transfer of the driving operation is desirably performed in a more modest mode than the change notification.

The change execution section in the above embodiments is set outside a high driving load section. However, the process of avoiding the high driving load section may be omitted. Further, when a main through lane immediately before the end point has a road shape with continuous curves, the change execution section may be set in a curve section from necessity.

In the above embodiments, examples of the travel control parameter to be adjusted in the switching section include the traveling speed, the inter-vehicular distance, the time headway, and the relative speed. However, the travel control parameter to be adjusted can be appropriately changed. Further, traveling scenes such as single traveling and following traveling may be classified in a more detailed manner to create a traveling state of a low driving load mode adapted to each traveling scene. Further, an update value of the travel control parameter for creating a traveling state of a low driving load mode may be adjusted on the basis of various pieces of information such as the state of the driver, a set value input by the driver, a road shape, and a weather condition.

The driving change control process in the above embodiments is desirably performed again from S101, for example, when a long and medium-term travel plan is regenerated due to a temporary road closure. According to the above configuration, even when a sudden route change occurs, a transfer of the driving operation from the autonomous driving function to the driver can be smoothly performed near an end point of an autonomous driving possible area which is set on the changed route.

The alert device used in the notification and the advance notification of a driving operation authority transfer can be appropriately changed. For example, an ultrasonic speaker may be used to reproduce a message voice so that only the driver can hear the message voice. Further, display of the advance notification and the notification may be shown on a display surface of a display device that differs from the HUD. Similarly, the detection device used in the detection of the awakening degree and the careless degree of the driver can also be appropriately changed.

Each of the functions relating to the driving change may be appropriately implemented by various electronic control units mounted on the vehicle as described in the above embodiments. Further, the number of processors provided in the autonomous driving ECU, the HCU 20, and the like may be appropriately increased. Further, various nontransitive and substantive storage media such as a flash memory and a hard disk can be employed as a configuration that stores a program executed by each of the processors.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A driving change control device in a vehicle equipped with an autonomous driving function for performing a driving operation on behalf of a driver, the driving change control device controlling an exchange of the driving operation between the autonomous driving function and the driver, and comprising:
   a section setting unit that sets a change execution section where a driving change from the autonomous driving function to the driver is performed; and
   a parameter adjustment unit that changes a travel control parameter referred to by the autonomous driving function in a switching section before the change execution section, to adjust a traveling state of the vehicle to be a state with a driving load lower than a driving load before arrival at the switching section.

2. The driving change control device according to claim 1, further comprising:
   an alert control unit that provides an alert to the driver by controlling an alert device mounted on the vehicle, wherein:
   the alert control unit notifies the driver of execution of the exchange of the driving operation after adjusting the traveling state of the vehicle according to a change of the travel control parameter is completed.

3. The driving change control device according to claim 2, further comprising:
   a driver information acquisition unit that acquires at least one of awakening degree information indicating an awakening degree of the driver and careless degree information indicating a careless degree of the driver.

4. The driving change control device according to claim 3, wherein:
   the alert control unit advances a start time of notification to the driver with respect to a time when the vehicle arrives at the change execution section as the awakening degree of the driver based on the awakening degree information becomes lower or as the careless degree of the driver based on the careless degree information becomes higher.

5. The driving change control device according to claim 3, wherein:
the alert control unit notifies the driver in advance of the execution of the exchanger of the driving operation before the vehicle arrives at the switching section when the awakening degree of the driver based on the awakening degree information is lower than a predetermined threshold or when the careless degree of the driver based on the careless degree information is higher than a predetermined threshold.

6. The driving change control device according to claim 3, wherein:
the parameter adjustment unit stops adjusting the travel control parameter to be a lower driving load state when the awakening degree of the driver based on the awakening degree information is higher than a predetermined threshold or when the careless degree of the driver based on the careless degree information is lower than a predetermined threshold.

7. The driving change control device according to claim 1, wherein:
the parameter adjustment unit:
measures an elapsed time after the exchange of the driving operation from the driver to the autonomous driving function; and
stops adjusting the travel control parameter to be a lower driving load state when the elapsed time is less than a threshold time.

8. The driving change control device according to claim 1, wherein:
the parameter adjustment unit stops adjusting the travel control parameter to be a lower driving load state when a traveling speed of the vehicle is lower than a threshold speed.

9. The driving change control device according to claim 1, further comprising:
a shape information acquisition unit that acquires shape information of a road where the vehicle is scheduled to travel by the autonomous driving function, wherein:
the section setting unit sets the change execution section to avoid a high driving load section that is preliminary defined as a section having a high driving load based on the shape information.

10. The driving change control device according to claim 1, wherein:
the parameter adjustment unit sets a target speed of the vehicle in constant-speed travelling as the travel control parameter, and adjusts the target speed to be a lower speed in the switching section.

11. The driving change control device according to claim 1, wherein:
the parameter adjustment unit sets a target inter-vehicular distance between the vehicle and a preceding vehicle in a follow-up traveling as the travel control parameter, and adjusts the target inter-vehicular distance to be a larger inter-vehicular distance in the switching section.

12. The driving change control device according to claim 1, wherein:
the parameter adjustment unit sets a target relative speed with respect to a preceding vehicle in follow-up traveling as the travel control parameter, and adjusts the target relative speed in the switching section to control a relative speed with respect to the preceding vehicle to be zero or to separate the vehicle away from the preceding vehicle.

13. The driving change control device according to claim 1, wherein:
the autonomous driving function selects one of a plurality of traffic lanes where the vehicle travels on a road including the plurality of traffic lanes, based on lane designation information included in the travel control parameter; and
the parameter adjustment unit updates the lane designation information to change a traffic lane of the vehicle to another one of the plurality of traffic lanes that is less crowded than a current traveling traffic lane.

14. The driving change control device according to claim 1, wherein:
when a following vehicle is disposed behind the vehicle, the parameter adjustment unit changes a mode of adjustment of the travel control parameter to reduce a deceleration generated in the vehicle in the switching section to be smaller than a deceleration generated in the vehicle when no following vehicle is disposed behind the vehicle.

15. A driving change control method for controlling an exchange of a driving operation between an autonomous driving function and a driver in a vehicle equipped with the autonomous driving function for performing the driving operation on behalf of the driver, the driving change control method comprising: by at least one processor,
setting a change execution section where a driving change from the autonomous driving function to the driver is performed; and
changing a travel control parameter referred to by the autonomous driving function in a switching section before the change execution section to adjust a traveling state of the vehicle to be a state with a driving load lower than a driving load before arrival at the switching section.

* * * * *